United States Patent [19]

Llewellyn et al.

[11] Patent Number: 4,883,983

[45] Date of Patent: Nov. 28, 1989

[54] SWITCHING SYSTEM FOR PLURAL LOAD CIRCUIT

[75] Inventors: David T. Llewellyn, Ebensburg; William J. Lichtenberger, Murrysville, both of Pa.

[73] Assignee: Robertshaw Controls Company, Richmond, Va.

[21] Appl. No.: 216,801

[22] Filed: Jul. 8, 1988

[51] Int. Cl.[4] ........................ H02B 1/24; H01H 19/42; H05B 3/02

[52] U.S. Cl. .................................... 307/112; 200/6 R; 219/483; 307/38

[58] Field of Search ........... 200/1 R, 6 R, 6 B, 6 BA, 200/6 BB, 6 C, 14, 18, 30 R, 31 R, 38 A, 38 FA, 38 BA, 38 CA, 61.86, 307, 336; 307/38, 112–113, 115, 116, 139, 140; 219/10.55 B, 10.55 D, 482, 483, 486

[56] References Cited

U.S. PATENT DOCUMENTS

| | | | |
|---|---|---|---|
| 3,110,789 | 11/1963 | Hild et al. | 337/93 |
| 3,905,003 | 9/1975 | Rosenberg et al. | 337/54 |
| 4,249,047 | 2/1981 | Huff et al. | 200/61.86 |
| 4,337,451 | 6/1982 | Fox | 337/93 |
| 4,342,886 | 8/1982 | Demi | 200/61.86 |
| 4,695,708 | 9/1987 | Schreder | 307/38 X |

*Primary Examiner*—J. R. Scott

*Attorney, Agent, or Firm*—Candor, Candor & Tassone

[57] ABSTRACT

A cyclable electrical switch construction, a system utilizing the switch construction and methods of making the same are provided, the cyclable electrical switch construction comprising a housing having a cyclable electrical switch therein and a rotatable actuator shaft that extends from the housing for setting the duty cycle of the switch in relation to the rotational position of the shaft in either rotational direction thereof from an "off" position thereof, and an electrical switch unit being carried on the housing and having structure operatively interconnected with the shaft so that the switch unit is actuated from one condition thereof to another condition thereof only when the shaft is rotated from the "off" position thereof in one rotational direction thereof. The cyclable electrical switch is used in a plural load circuit, preferably, as a control of a dual wattage heating element of a cooking unit.

18 Claims, 7 Drawing Sheets

SWITCHING SYSTEM FOR PLURAL LOAD CIRCUIT

BACKGROUND OF THE INVENTION

1. Field of the Invention

This invention relates to a new cyclable electrical switch construction and to a new system that utilizes such a cyclable electrical switch construction as well as to methods of making the same.

2. Prior Art Statement

It is known to provide a cyclable electrical switch construction that comprises a housing means having a cyclable electrical switch means therein and a rotatable actuator shaft that extends from the housing means for setting the duty cycle of the switch means in relation to the rotational position of the shaft in either rotational direction thereof from an "off" position thereof. For example, see the Hild U.S. Pat. No. 3,110,789; the Rosenberg U.S. Pat. No. 3,905,003 and the Fox U.S. Pat. No. 4,337,451.

It was suggested by others that it was desired to have such a cyclable switch construction operate just one load means when the actuator shaft is rotated in one rotational direction from its "off" position and to operate two load means when the actuator shaft is rotated in the other rotational direction from the "off" position thereof. However, no structure was suggested as to how this could be accomplished.

It is also known to have a separate switch unit carried on a housing means so as to be actuated by the same shaft that operates structure within that housing means. For example, see the Huff U.S. Pat. No. 4,249,047 and the Demi U.S. Pat. No. 4,342,886.

SUMMARY OF THE INVENTION

One feature of this invention is to provide a new cyclable electrical switch construction that has a unique selector switch means thereon that permits the switch construction to selectively control more than one wattage, such as a dual wattage range top heating element of a cooking apparatus or the like.

In particular, it is well known that a cyclable electrical switch construction can have the duty cycle of the switch means thereof set by a rotatable actuator shaft in relation to its rotational position in either rotational direction thereof from an "off" position thereof whereby such cyclable electrical switch construction will control the electrical current being supplied to a load means, such as a range top heating element.

However, it was suggested by others that it would be desirable to modify such prior known cyclable electrical switch construction so that the same would control only one load means when the actuator shaft is rotated in one rotational direction from its "off" position and to control not only that one load means but also an additional load means when the actuator shaft is rotated in the other rotational direction thereof from its "off" position.

Therefore, it was found according to the teachings of this invention that a separate electrical switch unit could be carried on the housing means of the prior known cyclable electrical switch construction and have means operatively interconnected to the actuator shaft thereof so that when the actuator shaft is rotated in one rotational direction thereof from its "off" position thereof, the switch unit would be actuated in such a manner that the same would add an additional load means to the load means normally controlled by the cyclable electrical switch construction. However, upon the actuator shaft being rotated in the other rotational direction from its "off" condition thereof, the switch unit would not be actuated so that the second load means would not be operated by the cyclical electrical switch construction whereby only the load means normally controlled by the cyclable switch construction would be controlled thereby.

For example, one embodiment of this invention provides a cyclable electrical switch construction that comprises a housing means having a cyclable electrical switch means therein and a rotatable actuator shaft that extends from the housing means for setting the duty cycle of the switch means in relation to the rotational position of the shaft in either rotational direction thereof from an "off" position thereof, and an electrical switch unit being carried on the housing means and having means operatively interconnected with the shaft so that the switch unit is actuated from one condition thereof to another condition thereof only when the shaft is rotated from the "off" position thereof in one rotational direction thereof.

Accordingly, it is an object of this invention to provide a new cyclable electrical switch construction having one or more of the novel features of this invention as set forth above or hereinafter shown or described.

Another object of this invention is to provide a new method of making a cyclable electrical switch construction, the method of this invention having one or more of the novel features of this invention as set forth above or hereinafter shown or described.

Another object of this invention is to provide a new system utilizing the new cyclable electrical switch construction of this invention, the system of this invention having one or more of the novel features of this invention as set forth above or hereinafter shown or described.

Another object of this invention is to provide a new method of making such a system, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENT

Figure 1:
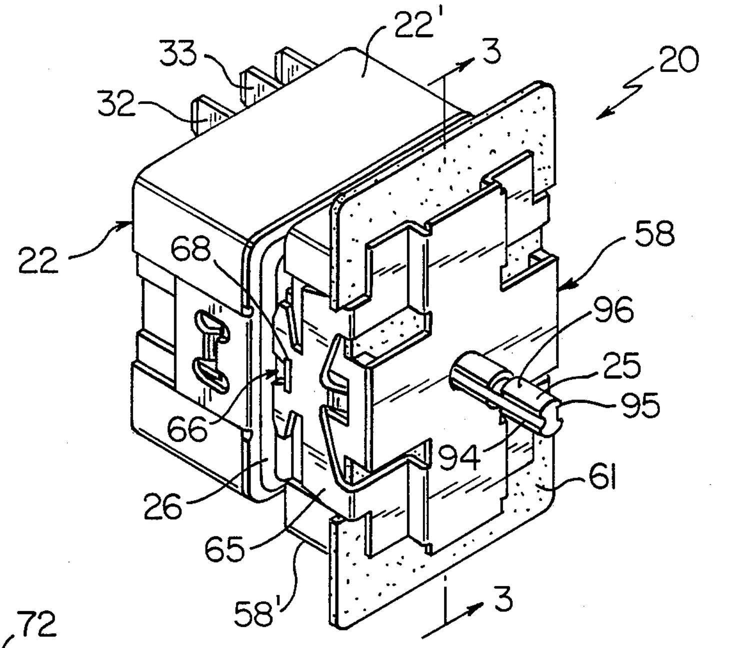
FIG. 1 is a perspective view illustrating the new cyclable electrical switch construction of this invention.
Figure 2:
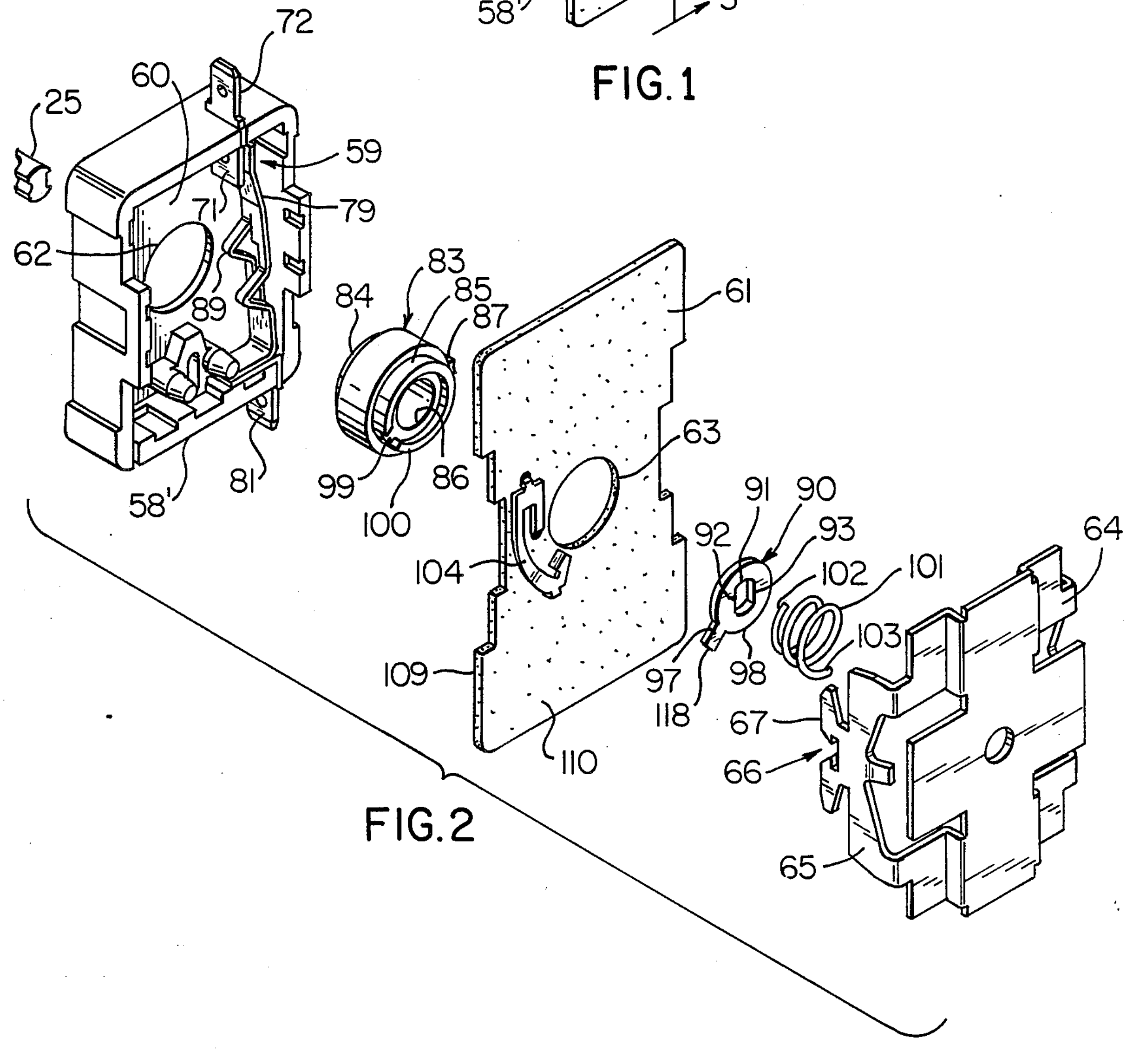
FIG. 2 is an exploded perspective view of certain parts of the cyclable electrical switch construction of FIG. 1.

While the various features of this invention are hereinafter described and illustrated as being particularly adapted to provide a new cyclable electrical switch construction to provide a means for controlling a dual wattage range top heating element of a cooking apparatus or the like, it is to be understood that the various features of this invention can be utilized singly or in various combinations thereof to provide a new cyclable electrical switch construction for controlling other load means of other apparatus as desired.

Therefore, this invention is not to be limited to only the embodiment illustrated in the drawings, because the drawings are merely utilized to illustrate one of the wide variety of uses of this invention.

Figure 10:
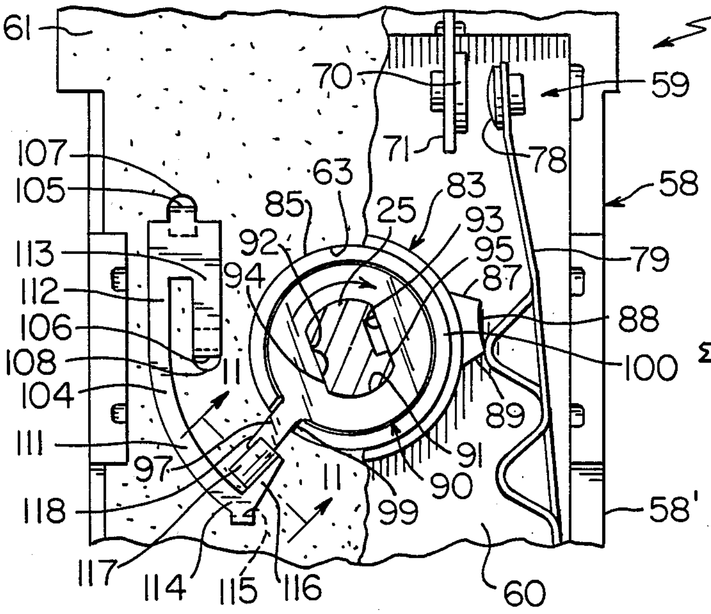
FIG. 10 is a view similar to FIG. 9 and illustrates the actuator shaft after the same has been rotated almost 360° from its "off" position in that other rotational direction thereof.
Figure 11:
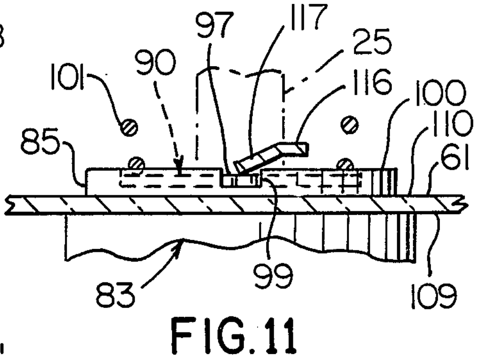
FIG. 11 is a fragmentary cross-sectional view taken on line 11—11 of FIG. 10.
Figure 12:
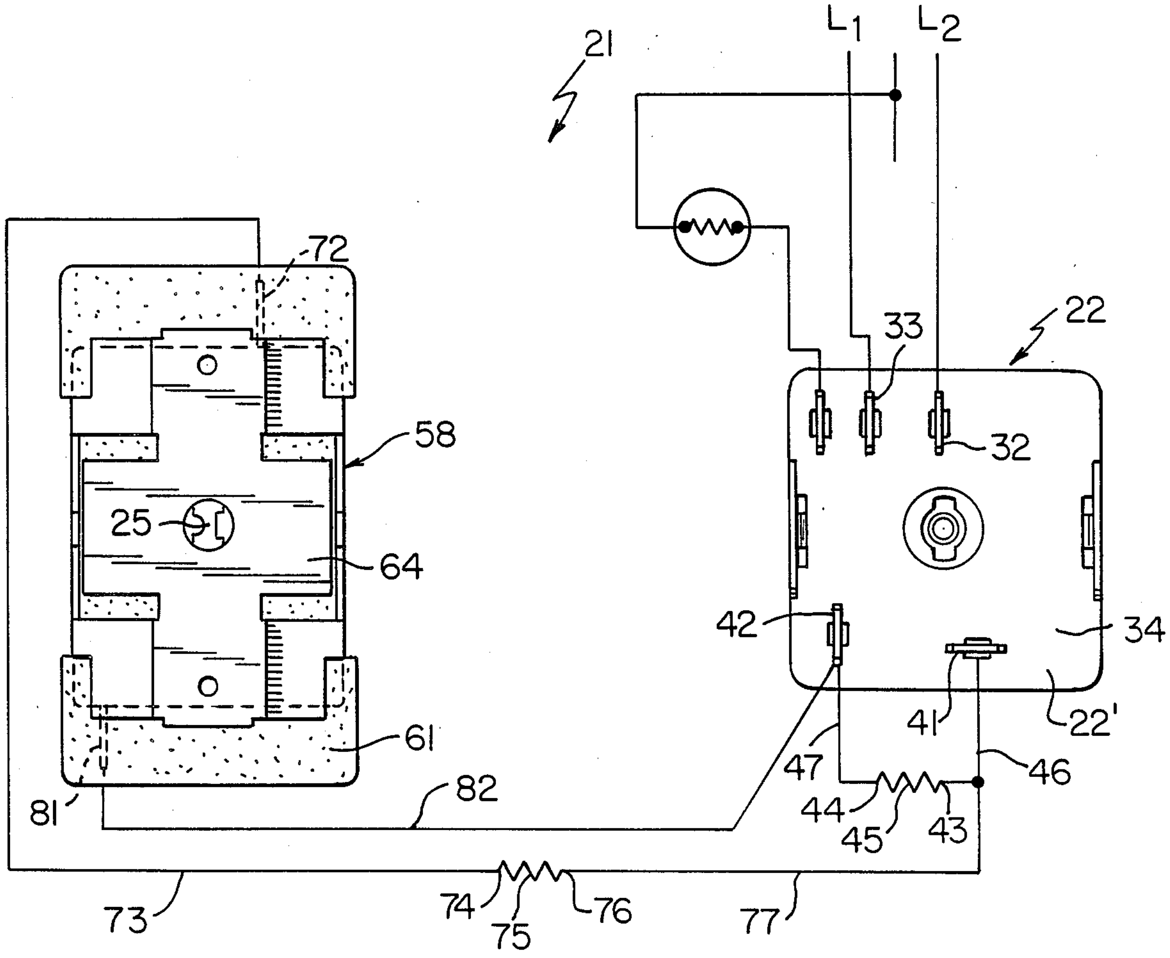
FIG. 12 is a schematic view illustrating the system of this invention utilizing the cyclable electrical switch construction of FIGS. 1-11.

Referring now to FIGS. 1-12, the new cyclable electrical switch construction of this invention is generally indicated by the reference numeral 20 and is utilized in the new system of this invention that is generally indicated by the reference numeral 21 in FIG. 12 in a manner hereinafter set forth.

Figure 13:
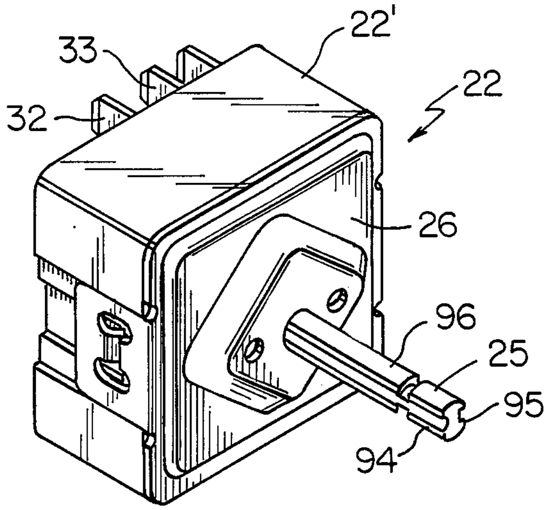
FIG. 13 is a perspective view of the prior known portion of the cyclable electrical switch construction of this invention.

The cyclable electrical switch construction 20 of this invention comprises a switch unit 22 (FIGS. 1 and 13) having housing means 22′ provided with a cyclable electrical switch means 23 therein (FIGS. 14, 15 and 16) and an on/off electrical switch means 24 therein (FIGS. 14 and 15), the housing means 22′ having a rotatable actuator shaft 25 (FIGS. 1 and 13) that extends outwardly from a cover plate means 26 of the housing means 22′ and is secured to a rotatable cam means 27 (FIGS. 14 and 15) that is also disposed in the housing means 22′ to be rotated therein upon rotation of the shaft 25 all in a manner well known in the art. For example, the housing means 22′, the cyclable electrical switch means 23, the on/off switch means 24, the actuator shaft 25 and the cam means 27 can be of the type fully disclosed in the aforementioned Hild U.S. Pat. No. 3,110,789; the Rosenberg U.S. Pat. No. 3,905,003 and the Fox U.S. Pat. No. 4,337,451 whereby these three U.S. patents are being incorporated into this disclosure by this reference thereto.

Since the details of the structure and operation of the switch unit 22 is well known in the art, only the details thereof believed necessary to understand the unique features of this invention will now be described.

The switch means 23 and 24 of the switch unit 22 respectively comprise fixed electrical contacts 28 and 29 respectively carried by terminal means 30 and 31 that have external portions 32 and 33 thereof extending from the rear side 34 of the housing means 22′ in the manner illustrated in FIG. 12 to be respectively interconnected to power source leads L1 and L2, the housing means 22′ being formed of any suitable electrically insulating material, such as plastic material as shown.

Figure 15:
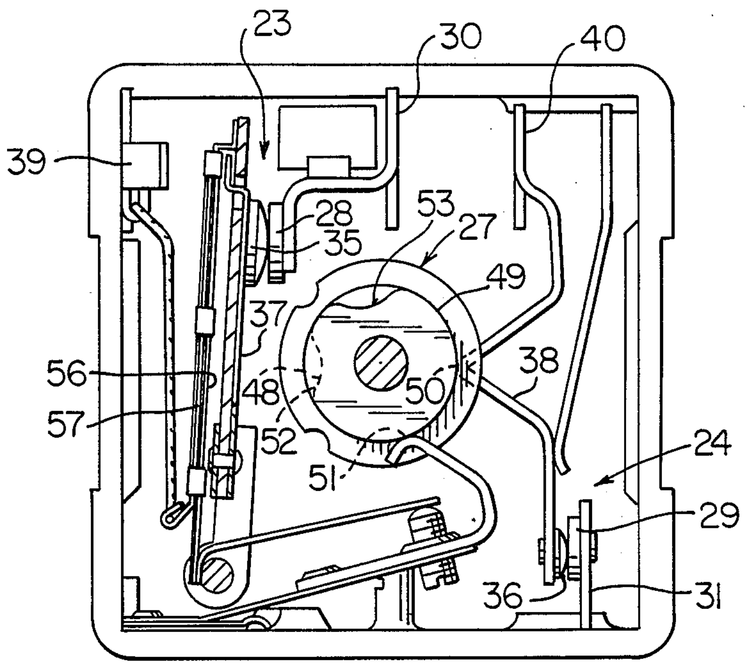
FIG. 15 is a view similar to FIG. 14 and illustrates the actuator shaft set in an "on" position thereof.

The electrical switch means 23 and 24 respectively have movable contacts 35 and 36 respectively carried by movable switch blade means 37 and 38 that are respectively interconnected to terminal means 39 and 40 that respectively have external portions 41 and 42 that extend from the rear side 34 of the housing means 22′in the manner illustrated in FIG. 12 to be respectively interconnected to opposed ends 43 and 44 of a first load means 45 by leads 46 and 47 so that when the switch means 23 and 24 respectively have the movable contacts 35 and 36 thereof placed against their respective cooperating fixed contacts 28 and 29 in the manner illustrated in FIG. 15, electrical current is adapted to be passed through the load means 45 as the load means 45 is, in effect, placed across the power source leads L1 and L2 by the closed switch means 23 and 24 of the switch unit 22.

Figure 14:
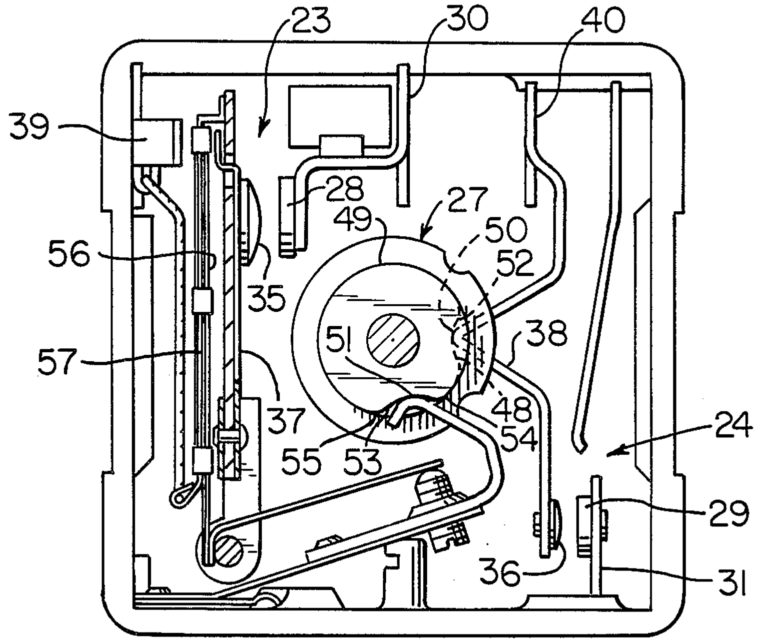
FIG. 14 is an enlarged front view of the structure illustrated in FIG. 13 and illustrates the same with the front cover removed and with the actuator shaft in its "off" position.

The cam means 27 of the switch unit 22 has spaced apart coaxial peripheral cam surfaces 48 and 49 that respectively operate on cam followers 50 and 51 of the switch blade means 38 and 37, the cam surface means 48 and 49 respectively having "off" recesses 52 and 53 to respectively receive the cam followers 50 and 51 therein when the actuator shaft 25 is disposed in the "off" position as illustrated in FIG. 14.

However, when the actuator shaft 25 is rotated in either a clockwise direction or a counterclockwise direction in the drawings from its "off" position of FIG. 14, the cam follower 50 of the switch blade 38 rides out of its "off" recess means 52 and the cam follower 51 of switch blade means 37 likewise rides out of its "off" recess means 53 so that the cam followers 50 and 51 respectively engage against the outboard cam surface means 48 and 49 and tend to hold the movable contact means 36 and 35 thereof respectively against the fixed contact means 29 and 28 in the manner illustrated in FIG. 15.

The cam surface means 48 of the cam member 27 is so constructed and arranged that the same always holds the movable contact 36 of the switch means 24 in contact with the fixed contact 29 when the actuator shaft 25 is turned to any "on" condition thereof.

The cam surface means 49 of the cam member 27 has its highest point 54 disposed adjacent one side of the "off" recess 53 and has its lowest point 55 disposed adjacent the other side of the recess means 53 so that the cam surface means 49 infinitely tapers downwardly from the high point 54 to the low point 55 and thereby controls the duty cycle of the cyclable electrical switch means 23 in a manner well known in the art.

Figure 16:
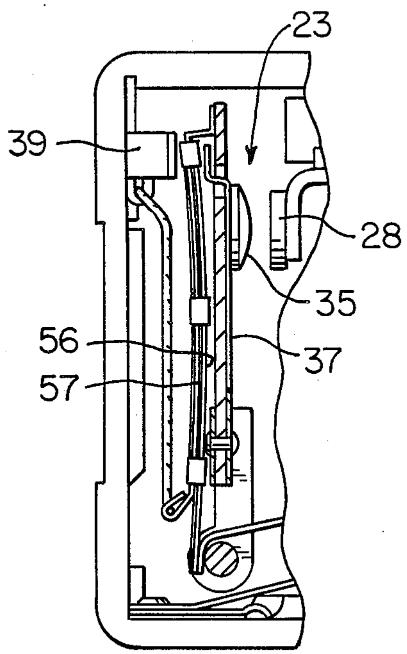
FIG. 16 is a fragmentary view similar to FIG. 15 and illustrates the cyclable switch means in its open condition by means of the heated bimetal means thereof.

In particular, the switch blade means 37 includes a bimetal member 56 and an electrical heater member 57 so constructed and arranged that electrical current is adapted to flow through the electrical heater member 57 whenever the movable contact 35 of the switch means 23 is disposed against the fixed contact 28 and thereby heats the bimetal member 56 which then tends to warp and move the movable contact 35 away from the fixed contact 28 in the manner illustrated in FIG. 16 whereby electrical current through the electrical heater member 57 is terminated so that the bimetal member 56 can then tend to cool and thereby place the movable contact 35 back into contact with the fixed contact 58 in the manner illustrated in FIG. 15. In this manner, the switch means 23 cycles between its closed and open positions as long as the actuating shaft 25 is set in any "on" position thereof.

Thus, by positioning the cam surface means 49 of the cam member 27 relative to the cam follower 51, the amount of on time of the switch means 23 relative to its off time is setable by the actuator shaft 25. For example, when the high point 54 of the cam surface means 49 is disposed adjacent the cam follower 51, the total amount of on time of the switch means 23 is at its greatest and when the low point 55 of the cam surface 49 is disposed adjacent the cam follower 51, the least amount of on time of the switch means 23 is provided whereby a setting of the cam surface 49 intermediate the high point 54 and the low point 55 will create an on time intermediate the greatest amount of on time and the least amount of on time thereof.

Accordingly, it can be seen that when the actuator shaft 25 is set in any "on" position thereof, the switch means 24 is closed and remains closed while the switch means 23 will cycle between its on and off condition and thereby provide for a cyclical flow of current through the load means 45 and if the load means 45 is a heating element of a cooking apparatus, the output temperature effect thereof is thereby controlled by the setting of the actuator shaft 25.

As previously stated, it is one feature of this invention to provide a means for having the switch unit 22 also control the operation of another load means in the same manner that the load means 45 is being controlled thereby when the actuator shaft 25 is rotated in one direction thereof relative to its "off" position and to only operate the load means 45 when the actuator shaft 25 is rotated in the other rotational direction from its "off" position.

Such a feature is provided by another switch unit of this invention that is generally indicated by the reference numeral 58 in FIGS. 1–12 and comprising a housing means 58' that has an electrical switch means 59 therein, the housing means 58' having a rear wall 60 and a front wall or plate means 61 respectively having opening means 62 and 63 passing therethrough so that the switch unit 58 can be telescoped onto the actuator shaft 25 of the switch unit 22 and be secured thereto in any suitable manner so that the switch units 22 and 58 form the new cyclable electrical switch construction 20 of this invention to be operated in a manner hereinafter set forth.

Figure 3:
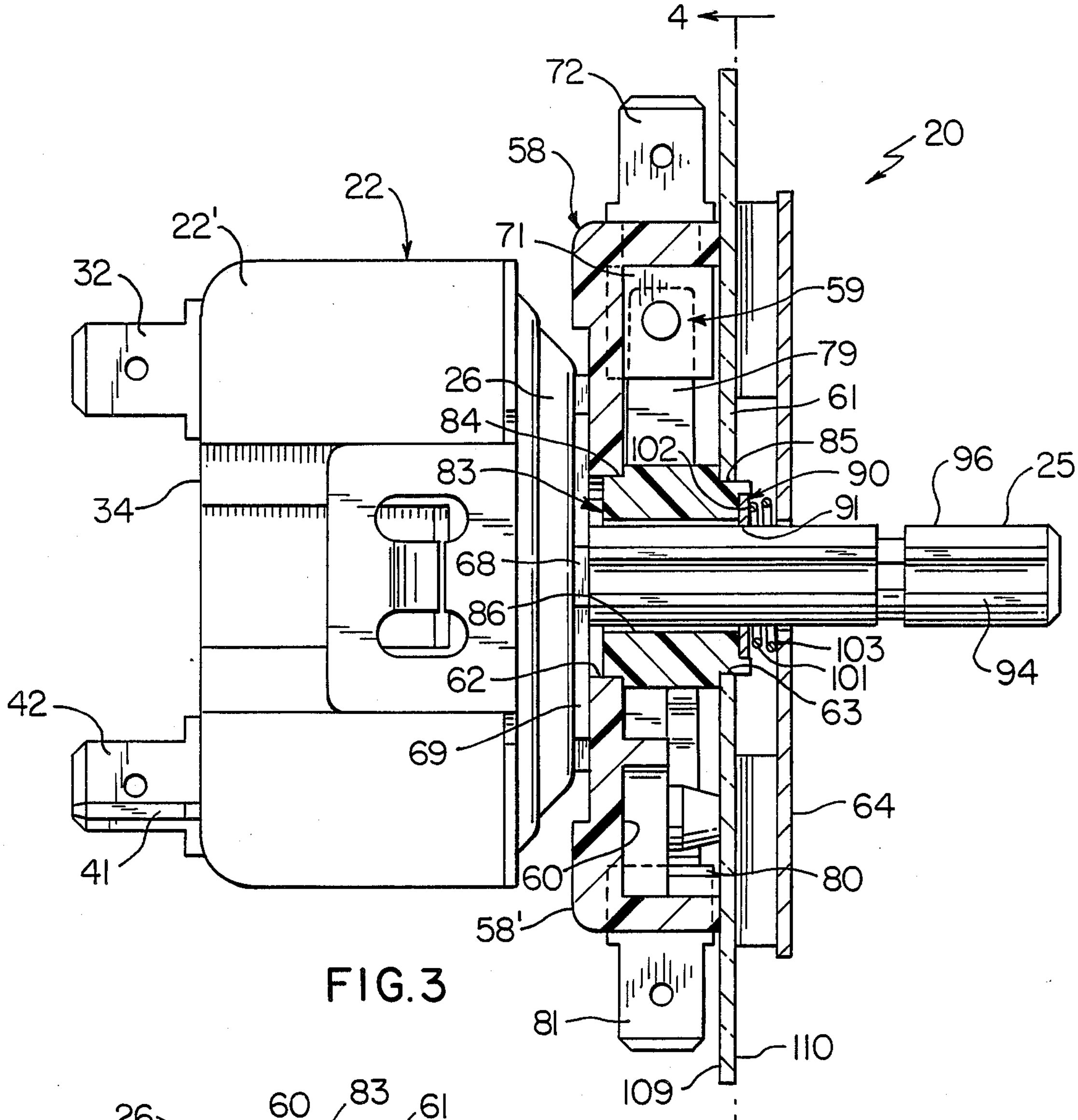
FIG. 3 is an enlarged view of the cyclable electrical switch construction of FIG. 1 and is shown partially in cross section that is taken on line 3—3 of FIG. 1.
Figure 5:
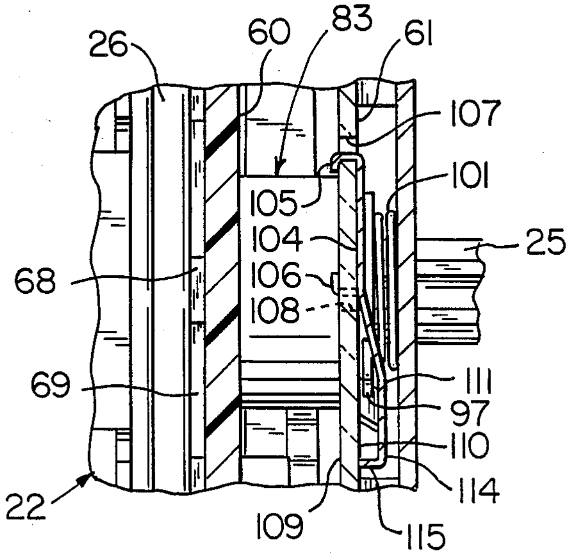
FIG. 5 is a fragmentary cross-sectional view taken on line 5—5 of FIG. 4.

The switch unit 58 includes a metallic mounting bracket member 64 that has a pair of side flanges 65 respectively provided with snap locking notch means 66 in the free ends 67 thereof, the bracket 64 being adapted to be disposed on top of the front plate means 61 of the housing means 58" and hold the same in its assembled relation to the housing means 58' by receiving in the locking notches 66 thereof outwardly directed tangs 68 of a plate means 69, FIG. 3, that is secured to the housing means 22' of the switch unit 22. In this manner, the switch unit 58 is snap-fitted to the tangs 68 of the plate 69 of the switch unit 22 and thereby causes the switch unit 58 to be secured on the front side 26 of the housing means 22' in a simple and effective manner.

Thus, it can be seen that the switch unit 22 that has been provided in the past for its own use separate from the switch unit 58 of this invention need not be greatly modified in any manner to accept the switch unit 58 of this invention except to have the plate means 69 mounted thereon with the plate means 69 thereby providing the interconnection between the switch units 22 and 58 in the manner previously set forth.

The switch means 59 of the switch unit 58 comprises a fixed contact means 70 carried on a terminal 71 that has a portion 72 that extends externally of the housing means 58' to be interconnected to an electrical lead 73, FIG. 12, that is interconnected to one side 74 of a second load means 75 that has its other side 76 interconnected by a lead 77 to the lead 46 for a purpose hereinafter set forth, the housing means 58' being formed of any suitable electrically insulating material, such as plastic material as shown.

The switch means 59 includes a movable contact 78 carried on a switch blade 79 that is interconnected to a terminal 80 that has a portion 81 that extends external to the housing means 58" to be interconnected to a lead 82 that is interconnected to the extending portion 42 of the terminal 40 of the switch means 24 of the switch unit 22.

Figure 4:
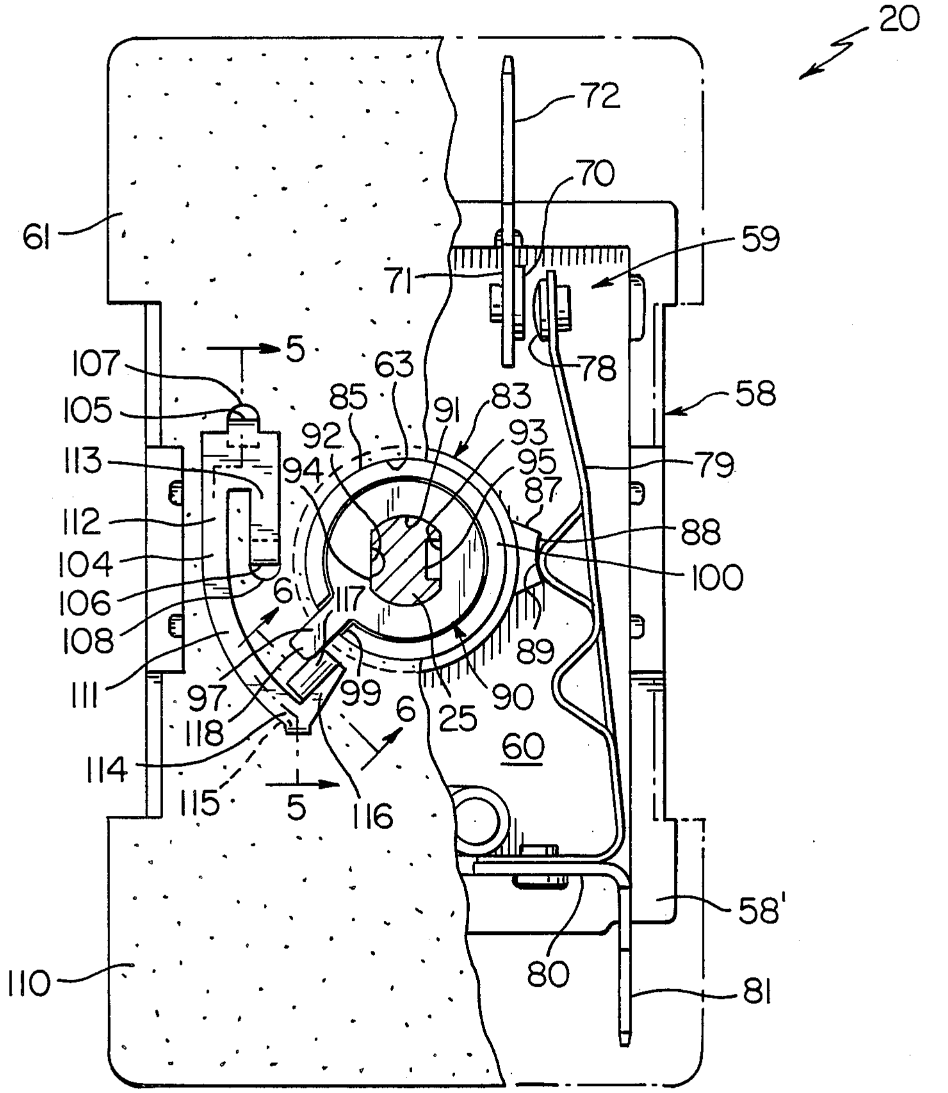
FIG. 4 is a cross-sectional view taken on line 4—4 of FIG. 3 and illustrates the cyclable electrical switch construction with part of the front portion thereof broken away, FIG. 4 illustrating the actuator shaft set in its "off" position.

In this manner, as long as the switch means 59 of the switch unit 58 is in the open condition as illustrated in FIG. 4, no electrical current can flow through the second load means 75 even though the switch unit 22 is set to permit electrical current to flow through the first load means 45 in the manner previously set forth.

Figure 9:
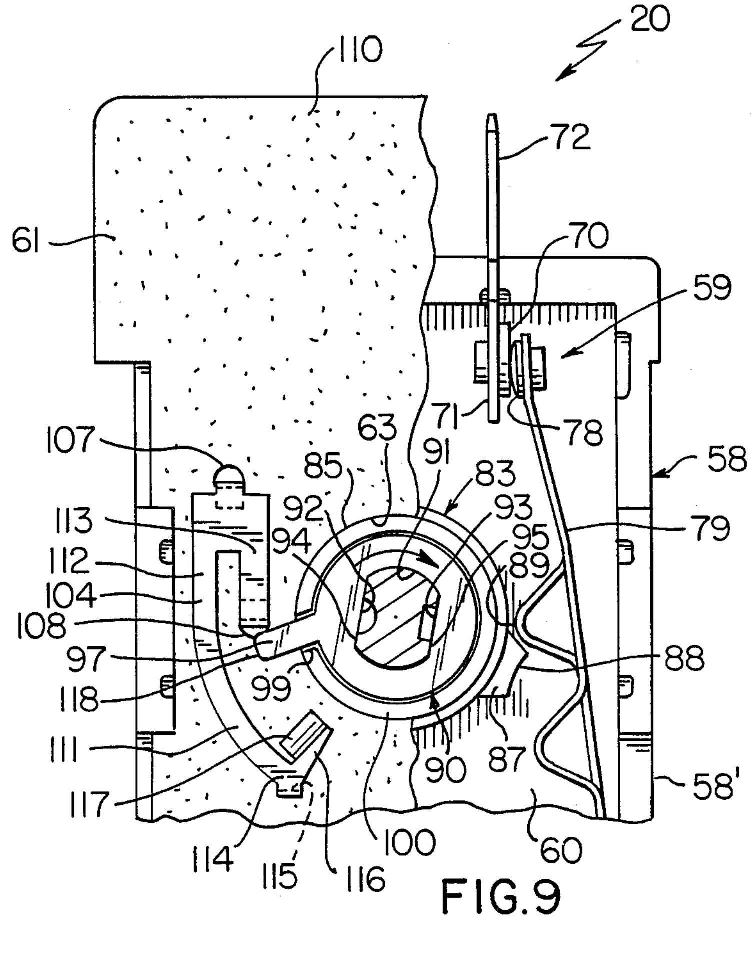
FIG. 9 is a view similar to FIG. 7 and illustrates the actuator shaft having been turned in the other rotational direction thereof from its "off" position.

However, when the switch means 58 is disposed in its closed condition, as illustrated in FIG. 9 in a manner hereinafter set forth, the second load means 75 is placed in parallel with the first load means 45 so that when the switch unit 22 cycles electrical current through the load means 45 by the cyclable switch means 23, electrical current is also simultaneously cycled through the load means 75 so that the load means 45 and 75 have the electrical current flow therethrough occurring in unison and at the same duty cycle rate as determined by the setting of the actuator shaft 25 in a manner hereinafter set forth. In this manner a dual wattage arrangement is being provided by the switch construction 20 of this invention.

The switch unit 58 includes a rotatable cam member 83 which has a tubular and cylindrical extension 84 on one end thereof for being rotatably mounted in the opening 62 in the rear wall 60 of the housing means 58' and a tubular and cylindrical portion 85 on the other end thereof to be rotatably mounted in the opening 65 in the front wall or plate means 61 of the housing means 58' whereby the openings 62 and 63 rotatably mount the cam member 83 within the housing means 58'.

The cam member 83 has a central opening 86 passing completely therethrough and being adapted to telescopically receive the actuator shaft 25 therethrough while being rotatable relative to the shaft as will be apparent hereinafter. The cam member 83 has an outwardly directed peripheral cam lobe 87 provided with a concave cam surface means 88 at the outer end thereof and being adapted to receive a cam follower 89 of the switch blade 79 of the switch means 59 therein when the actuator shaft 25 is disposed in its "off" position as will be apparent hereinafter whereby the cam lobe 87 causes the switch blade 79 to be held in its open position as illustrated in FIG. 4 as long as the actuator shaft 25 is disposed in the "off" position thereof as illustrated in FIG. 4.

The cam member 83 is adapted to be operatively interconnected to the actuator shaft 25 by a drive member or driver 90 that has an opening 91 passing therethrough and defining opposed flat side means 92 and 93 thereon which respectively are adapted to engage against longitudinally grooved side means 94 and 95 formed along the external peripheral surface 96 of the actuator shaft 25 in the manner illustrated in FIG. 4 so that the driver 90 is adapted to be axially movable on the shaft 25 while being keyed thereto so as to rotate in unison with the shaft 25 to operatively interconnect the shaft 25 to the switch means 59 in a manner hereinafter set forth.

The driver 90 has an outwardly directed drive tang 97 that extends outwardly from the outer peripheral surface 98 thereof, the drive tang 97 being adapted to be received in a slot means 99 formed in an annular ridge 100 located at the end 85 of the cam member 83 so that the drive tang 97 will drive the cam member 83 therewith as long as the drive tang 97 is disposed in the slot means 99.

A compression spring 101 is disposed between the bracket 84 and the driver 90 so that one end 102 of the spring 101 bears against the driver 90 and the other end 103 thereof bears against the bracket 64 whereby the compressive force of the compression spring 101 holds the driver 90 against the cam member 83 so as to hold the drive tang 97 in the slot 99 as long as the drive tang is aligned with the slot 99.

When the slot 99 of the cam member 83 is aligned with the drive tang 97 and the actuating shaft 25 is disposed in the "off" position thereof as illustrated in FIG. 4, it can be seen that the cam lobe 87 is positioned so that the cam surface 88 receives the cam follower 89 of the switch blade 79 therein so that the movable contact 78 of the switch means 59 is held in the open condition thereof.

A spring-like metallic member 104 is mounted to the front plate means 61 of the switch unit 58 by having a pair of spaced apart tangs 105 and 106 thereof projecting through suitable openings 107 and 108 in the plate means 61 and then being bent over the rear side 109 thereof so that the spring-like member 104 is disposed on the front side 110 of the plate-like member 61, the plate-like member 61 being formed of any suitable electrically insulating material.

The member 104 has an elongated arm 111 that has one end 112 extending in an offset manner from the secured portion 113 of the member 104 and an opposed free end 114 that has a downwardly extending end portion 115 that bears against the front surface 110 of the plate means 61 so as to hold the free end 114 spaced from the surface 110 a predetermined amount for a purpose hereinafter set forth.

Figure 6:
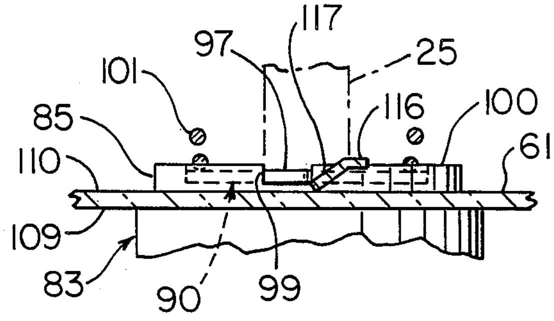
FIG. 6 is a fragmentary cross-sectional view taken on line 6—6 of FIG. 4.
Figure 8:
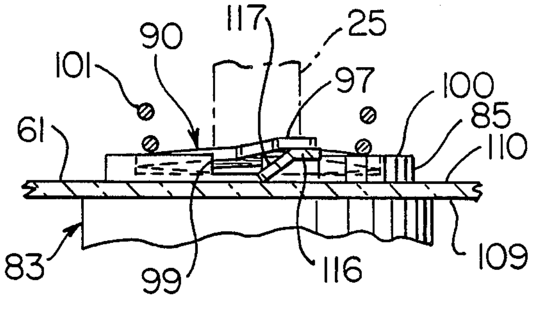
FIG. 8 is a fragmentary cross-sectional view taken on line 8—8 of FIG. 7.

The free end 114 of the spring member 104 also has an offset tang 116 that is disposed at an angle relative to the surface 110 of the front plate 61 and extends toward and against the same so as to provide a ramp or angled cam surface 117 in the manner illustrated in FIG. 6, the tang 116 being disposed closely adjacent an outer portion 118 of the drive tang 97 which extends beyond the annular ridge 100 of the cam member 83.

Figure 7:
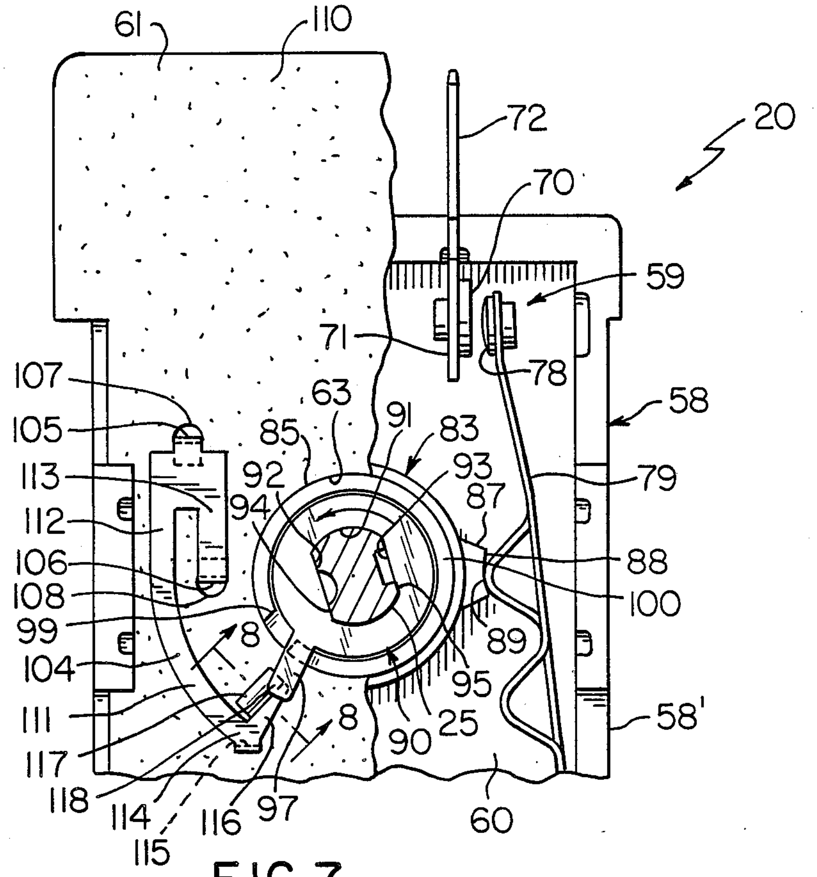
FIG. 7 is a fragmentary view similar to FIG. 4 and illustrates the actuator shaft after the same has been initially turned in one rotational direction from its "off" position.

In this manner, when viewing the switch unit 58 in FIG. 4, rotation of the actuator shaft 25 in a counterclockwise direction will cause the driver 90 and its drive tang 97 to rotate in unison with the shaft 25 and have the end portion 118 of the drive tang 97 immediately ride up on the cam surface 117 of the spring member 104 and thereby have the drive tang 97 of the driver 90 lifted out of the slot 99 of the cam member 83 and place the drive tang 97 onto the outer surface 119 of the annular ridge 100 of the cam member 83 whereby the drive member 90 is unclutched or disengaged from the cam member 83 so that the cam member 83 will not rotate in unison therewith as long as the actuating shaft 25 is rotated in a counterclockwise direction in FIG. 4 from the "off" position of the actuator shaft 25. Thus, the switch means 59 of the switch unit 58 is maintained in its open condition as illustrated in FIG. 7 and the drive tang 97 of the driver 90 is carried over the free end 114 of the spring member 104 to permit further counterclockwise rotation of the actuator shaft 25 in the manner illustrated in FIG. 8, the tang 97 of the driver 90 bearing against the surface 119 of the annular ridge 100 during such counterclockwise movement as the compression spring 101 is still forcing the driver 90 toward the cam member 83.

In order to prevent rotational movement of the cam member 83 because of the friction created by the rotating driver 90 being pushed thereagainst by the compression spring 101 while the actuator shaft 25 is being rotated in this counterclockwise direction from its "off" position, the concave cam surface 88 of the cam lobe 87 cooperates with the cam follower 89 to hold the cam member 83 from rotating with the rotating driver 90.

The actuator shaft 25 can be returned to its "off" position at any desired time by rotating the shaft 25 in either rotational direction whereby once the shaft 25 is at its "off" position, the drive tang 97 of the driver 90 will be forced into the slot 99 by the force of the compression spring 101.

However, when the actuating shaft 25 is rotated in a clockwise direction from the "off" position of the acutator shaft 25 in FIG. 4, it can be seen that the drive tang 97 of the driver 90 remains in the slot 99 of the cam member 83 to thereby cause the cam member 83 to rotate in unison therewith in a clockwise direction and cause the cam lobe 87 to move away from the cam follower 89 of the switch blade 79 in the manner illustrated in FIG. 9 and thereby permit the movable contact 78 of the switch means 59 to be placed in electrical contact with the fixed contact 70 as long as the actuator shaft 25 is being rotated in a clockwise direction from its "off" position and even when the same is continued to move in the clockwise direction back to the "off" position, the cam member 83 holding the tang 97 spaced sufficiently from the surface 110 of the plate means 61 so that the tang 97 will readily pass over the secured portion 113 of the spring member 104 during such movement thereof even though the drive tang 97 is in the slot 99 of the cam member 83.

For example, reference is now made to FIGS. 10 and 11 whereby it can be seen that the drive tang 97 of the driver 90 is adapted to cam under the tang 116 of the spring member 104 as the clockwise rotating driver 90 is being moved back to the "off" position thereof so that the cam lobe 87 again cams open the switch means 59 as illustrated in FIG. 10.

In this manner, the shaft 25 can be rotated in either rotational direction from its "off" position through 360° to be returned to its "off" position.

Thus, it can be seen that the new switch construction 20 of this invention can be formed from relatively few parts in a relatively simple manner by the methods of this invention so that the resulting switch unit 58 can be combined with the switch unit 22 to operate in a manner now to be set forth.

After the switch unit 58 of this invention has been formed in the manner previously set forth, the same is attached to the housing means 22' of the switch unit 22 by telescoping the switch unit 58 onto the shaft 25 when the shaft 25 is disposed in its "off" position and when the driver 90 has its drive tang 97 disposed in the slot 99 of the cam means 83 and thereby is disposed in its "off" position so that the flat sides 92 and 93 of the driver 90 will telescope on the longitudinally grooved sides 94 and 95 of the shaft 25 and thereby permit the lock notches 66 of the bracket 64 to snap onto the tangs 68 of the plate 69 that is carried by the housing means 22' whereby the switch unit 22 is converted into the switch construction 20 of this invention in a simple and effective manner.

Thereafter, the switch construction 20 of this invention is adapted to be electrically interconnected into the system 21 in the manner illustrated in FIG. 12 so that the first load means 45 is disposed in parallel with the second load means 75.

As previously stated, while the load means 45 and 75 can be any suitable load means, one embodiment of this invention is to have the load means 45 and 75 each comprise a part of a single heating element of a range top arrangement of a cooking apparatus or the like so that the cyclable electrical switch construction 20 of this invention will control the operating setting of such heating element.

In particular, should the operator of the system 21 desire both load means 45 and 75 to be operated at the same time, the operator turns the actuator shaft 25 from its "off" position in a clockwise direction as illustrated in FIG. 9 so that the driver 90 remains in driving relation with the cam means 83 to rotate the cam means 83 therewith through the interlocking of the drive tang 97 in the drive slot 99 whereby the cam lobe 87 of the cam member 83 moves out of engagement with the cam follower 89 of the switch blade 79 so that the movable contact 78 of the switch blade 79 is disposed into electrical contact with the fixed contact 70 and thereby close the switch means 59 regardless of where the actuating shaft 25 is eventually set in the clockwise direction thereof, the rotation of the shaft 25 in the clockwise direction thereof first moving the highest point 54 of the cam means 27 of the switch unit 22 against the follower 51 of the cyclable switch means 23 to provide for the maximum on time of the cyclable switch means 23 as previously set forth. Thus, it can be seen that when the actuator shaft 25 is moved in a clockwise direction from its "off" position, not only does the switch means 24 and cyclable switch means 23 of the switch unit 22 close but also the switch means 59 of the switch unit 58 closes so that the cyclable switch means 23 will turn on and off the load means 45 and 75 at a duty cycle rate set by the position of the actuator shaft 25.

However, should the operator desire to operate only the load means 45, the operator turns the actuator shaft 25 in a counterclockwise direction from the "off" position thereof illustrated in FIG. 4 so that the initial rotation of the shaft 25 causes the drive tang 97 of the driver 90 to ride up the cam surface 117 of the tang 116 of the spring member 104 and thereby ride out of the drive slot 99 of the cam means 83 so that the cam means 83 will not rotate therewith through further counterclockwise rotation of the shaft 25. This initial counterclockwise rotation of the shaft 25 from the "off" position thereof causes the low point 55 of the cam member 27 to act on the follower 51 of the cyclable switch means 23 and permits the cyclable switch means 23 and switch means 24 to close so that only the load means 45 will be controlled by the cycling action of the cyclable switch means 23 in the manner previously set forth because the cam member 83 of the switch unit 58 is declutched or disengaged from the driver 90 by the spring member 104 in the manner previously set forth whereby the switch means 59 in the switch unit 58 remains open and thereby prevents any electrical current from being directed by the switch unit 22 to the load means 75. The setting of the shaft 25 in a desired position in the counterclockwise direction sets the rate of the duty cycle of the cyclable switch means 23 for operating the load means 45 in the manner previously set forth.

Of course, when it is desired to turn off the system 21, the operator turns the actuator shaft 25 in either rotational direction from its initially set position to the "off" position thereof whereby the cam means 83 opens or keeps open the switch means 59 and the cam member 27 opens the switch means 23 and 24.

While it has been previously set forth that the highest point 54 of the cam means 27 of the switch unit 22 is reached upon initial clockwise rotation of the actuator shaft 25, it is to be understood that the high and low points 54 and 55 of the cam means 24 could be reversed so that the low point would be reached upon initial clockwise rotation of the actuator shaft 25, if desired.

In any event, it can be seen that the switch unit 58 of this invention is carried on the housing means 22' of the switch unit 22 and has means operatively interconnected to the actuator shaft 25 so that the switch unit 58 is actuated from one condition thereof to another condition thereof only when the actuator shaft 25 is rotated from the "off" position thereof in one rotational direction thereof which, in the embodiment illustrated in the drawings, is when the actuator shaft 25 is rotated in a clockwise direction from the "off" position thereof as the spring member 104 disengages the driver 90 from the cam member 83 when the actuator shaft 25 is rotated in a counterclockwise direction from the "off" position thereof to prevent the switch means 59 from closing.

Thus, it can be seen that this invention not only provides a new cyclable electrical switch construction and method of making the same, but also this invention provides a new system utilizing such a cyclable electrical switch construction and method of making the same.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a cyclable electrical switch construction that comprises a housing means having a cyclable electrical switch means disposed completely therein and a rotatable actuator shaft that extends from said housing means for setting the duty cycle of said switch means in relation to the rotational position of said shaft in either rotational direction thereof from an "off" position thereof, the improvement comprising an electrical switch unit carried on said housing means and being completely external to said housing means and separate from said switch means while having actuating means operatively interconnected with said shaft so that said switch unit is actuated from one condition thereof to another condition thereof only when said shaft is rotated from said 37 off" position thereof in one rotational direction thereof.

2. A switch construction as set forth in claim 1 wherein said switch unit has opening means passing therethrough that telescopically receives said shaft therethrough so that said switch unit is mounted on said shaft.

3. A switch construction as set forth in claim 1 wherein said one condition of said switch unit is an "on" condition thereof.

4. A switch construction as set forth in claim 1 wherein said switch unit has a pair of electrical contact means therein that normally are in an open condition thereof when said shaft is in its "off" position, said actuating means of said electrical switch unit closing said contact means when said shaft is rotated from said "off" position thereof in said one rotational direction thereof.

5. A switch construction as set forth in claim 4 wherein said actuating means of said electrical switch unit comprises a cam member, a driver for said cam member and normally being in a driving relation with said cam member, and means for disengaging said driver from its normal engagement with said cam member when said shaft is rotated from said "off" position thereof in the other rotational direction thereof.

6. A switch construction as set forth in claim 5 wherein said cam member has an opening means passing therethrough and telescopically receiving said shaft therethrough so as to be rotatably mounted on said shaft.

7. A switch construction as set forth in claim 6 wherein said cam member has an outer peripheral surface means provided with a recess means therein that receives one of said contact means therein when said shaft is in said "off" position thereof.

8. A switch construction as set forth in claim 7 wherein said driver has an opening means passing therethrough and telescopically receiving said shaft therethrough, said opening means of said driver interlocking with said shaft so that said driver rotates in unison with said shaft.

9. A switch construction as set forth in claim 8 wherein said cam member has a slot formed therein, said driver having a drive tang normally disposed in said slot of said cam member to interconnect said driver and said cam member together so that said shaft will rotate said driver and said cam member in unison therewith when said shaft is rotated in said one rotational direction from said "off" position thereof, said means for disengaging said driver from said cam member comprising means for lifting said tang from said slot when said shaft is rotated in the other rotational direction from said "off" position thereof.

10. In a system comprising a first load means, an electrical power source, and a cyclable electrical switch construction operatively interconnected to said first load means and said source, said cyclable electrical switch construction comprising a housing means having a cyclable electrical switch means disposed completely therein and a rotatable actuator shaft that extends from said housing means for setting the duty cycle of said switch means for interconnecting said source to said first load means in relation to the rotational position of said shaft in either rotational direction thereof from an "off" position thereof, the improvement comprising an electrical switch unit carried on said housing means and being completely external to said housing means and separate from said switch means while having actuating means operatively interconnected with said shaft so that said switch unit is actuated from an "off" condition thereof to an "on" position there in one rotational direction thereof, and a second load means, said switch unit being operatively interconnected to said source and to said second load means to interconnect said source to said second load means only when said switch unit is in said "on" condition thereof.

11. A system as set forth in claim 10 wherein said switch unit has opening means passing therethrough that telescopically receives said shaft therethrough so that said switch unit is mounted on said shaft.

12. A system as set forth in claim 10 wherein said first load means and said second load means respectively comprise parts of the same electrical heating unit of a cooking apparatus.

13. A system as set forth in claim 10 wherein said switch unit has a pair of electrical contact means therein that normally are in an open condition thereof when said shaft is in its "off" position, said actuating means of said electrical switch unit closing said contact means when said shaft is rotated from said "off" position thereof in said one rotational direction thereof.

14. A system as set forth in claim 13 wherein said actuating means of said electrical switch unit comprises a cam member, a driver for said cam member and normally being in a driving relation with said cam member, and means for disengaging said driver from its normal engagement with said cam member when said shaft is rotated from said "off" position thereof in the other rotational direction thereof.

15. A system as set forth in claim 14 wherein said cam member has an opening means passing therethrough and telescopically receiving said shaft therethrough so as to be rotatably mounted on said shaft.

16. A system as set forth in claim 15 wherein said cam member has an outer peripheral surface means provided with a recess means therein that receives one of said contact means therein when said shaft is in said "off" position thereof.

17. A system as set forth in claim 16 wherein said driver has an opening means passing therethrough and telescopically receiving said shaft therethrough, said opening means of said driver interlocking with said shaft so that said driver rotates in unison with said shaft.

18. A system as set forth in claim 17 wherein said cam member has a slot formed therein, said driver having a drive tang normally disposed in said slot of said cam member to interconnect said driver and said cam member together so that said shaft will rotate said driver and said cam member in unison therewith when said shaft is rotated in said one rotational direction from said "off" position thereof, said means for disengaging said driver from said cam member comprising means for lifting said tang from said slot when said shaft is rotated in the other rotational direction from said "off" position thereof.

* * * * *

UNITED STATES PATENT AND TRADEMARK OFFICE
CERTIFICATE OF CORRECTION

PATENT NO. : 4,883,983

DATED : November 28, 1989

INVENTOR(S) : David T. Llewellyn et al

It is certified that error appears in the above—identified patent and that said Letters Patent is hereby corrected as shown below:

Column 12, line 24, before "position" insert --condition thereof only when said shaft is rotated from said "off"--.

Signed and Sealed this

Thirteenth Day of November, 1990

*Attest:*

HARRY F. MANBECK, JR.

*Attesting Officer*

*Commissioner of Patents and Trademarks*